UNITED STATES PATENT OFFICE 2,551,013

BENZODIOXAN AMINO ALCOHOLS

James F. Kerwin, Philadelphia, Pa., assignor to Smith, Kline & French Laboratories, Philadelphia, Pa., a corporation of Pennsylvania No Drawing. Application May 28, 1949, Serial No. 96,159

5 Claims. (Cl. 260—338)

This invention relates to certain new chemical compounds which more particularly comprise certain benzodioxan amino alcohols.

The benzodioxan amino alcohols contemplated by this invention have been found to have utility as intermediates in organic syntheses and by way of example as intermediates for use in the preparation of certain benzodioxan derivatives which possess physiological properties. The compounds of this invention have the following general formula:

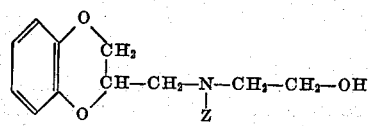

in which Z is selected from the group consisting of lower alkyl, lower alkenyl and benzyl.

It will be understood that the inorganic and organic addition salts of the several benzodioxan amino alcohols formed with inorganic and organic acids, as, for example, sulfuric, hydrochloric, phosphoric, sulfamic, tartaric, glycolic, succinic, hydrobromic, etc., are contemplated as a part of and included in this invention. The several salts will be respectively made apparent from the above general formulae by the simple addition to the amino group of an organic or an inorganic acid radical.

The inorganic and organic salts of the several compounds will be readily prepared from the benzodioxan amino alcohols and recovered by usual and well known procedure for the preparation of salts from bases.

In the following description of procedure for the preparation of the benzodioxan amino alcohols according to this invention and specific examples of such alcohols, it will be understood that where formulae are set out the substituent Z will be as given above with reference to the formulae above.

All of the several benzodioxan amino alcohols contemplated by this invention will be prepared by a process which will be made apparent by the following scheme:

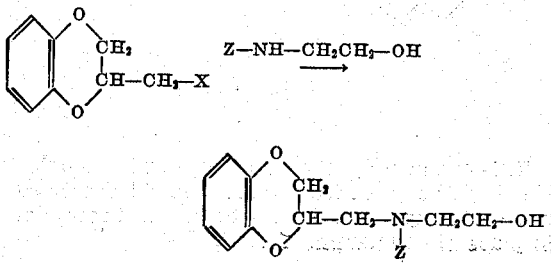

The benzodioxan amino alcohols according to this invention are prepared, as indicated above, by reaction of 2-chloromethylbenzodioxan, or 2-bromomethylbenzodioxan, with an N-monosubstituted amino alcohol of the structure exemplified above. The reaction is advantageously carried out in an inert solvent, such as dry xylene, and the base obtained is usually purified by crystallization as the hydrochloride or other addition salt, although the free base may be isolated as such by distilling off the solvent. It is also advantageous to employ an excess of the N-monosubstituted amino alcohol to remove the hydrogen halide formed as a by-product of the reaction. When the benzodioxan amino alcohol is obtained as a salt, the free base will readily be obtained by usual and well known procedure, as, for example, by addition of a strong base, as sodium hydroxide, to a cold aqueous solution of the salt and extraction of the free base into a solvent such as ether or benzene, and distilling off the solvent.

In the preparation of the benzodioxan amino alcohol as described above, an N-monosubstituted amino alcohol, corresponding to the benzodioxan amino alcohol to be produced, and which is well known or obviously prepared, will be used for reaction with 2-chloromethylbenzodioxan, or 2-bromomethylbenzodioxan. Thus, by way of illustration the following N-monosubstituted amino alcohols may be used:

2-methylaminoethanol
2-ethylaminoethanol
2-allylaminoethanol
2-benzylaminoethanol
2-(cyclohexylaminoethanol)
2-isopropylaminoethanol
2-(n-heptylamino)ethanol
2-(cyclohexylisopropylamino)ethanol When it is desired to use the benzodioxan amino alcohols according to this invention as intermediates for the preparation of benzodioxan β-haloethylamines, the benzodioxan amino alcohol corresponding to the benzodioxan β-haloethylamine to be prepared from it will be reacted with, for example, thionyl chloride or bromide or with hydrochloric acid or hydrobromic acid to effect the substitution of chlorine or bromime for the hydroxyl (OH) group of the benzodioxan amino alcohol. This reaction will be readily accomplished by usual and well known procedure for replacing a hydroxyl group with halogen.

Where in the above described procedure the desired benzodioxan β-haloethylamine is obtained in the form of a salt, as the hydrochloride, or other organic or inorganic salt through the use of an organic or inorganic salt of the benzodioxan amino alcohol as an intermediate, the free base will readily be obtained by addition of a strong base to a cold aqueous solution of the benzodioxan β-haloethylamine salt and extraction of the free base into an organic solvent such as ether or benzene.

The following examples will more specifically illustrate the benzodioxan amino alcohols according to this invention and procedure for their preparation and, in addition, use thereof as intermediates in the preparation of benzodioxan derivatives.

EXAMPLE 1

*2-[N-(β-hydroxyethyl)-N-ethylaminomethyl] benzodioxan*

For the preparation of this compound, a solution of 20.2 g. 2-chloromethylbenzodioxan, 19.6 g. of ethylaminoethanol and 50 ml. of dry xylene is refluxed for thirteen and one-half hours. The cooled solution is diluted with ether and ethylaminoethanol hydrochloride, formed as a by-product of the reaction, is removed by filtration.

The filtrate is washed repeatedly with water, dried and treated with anhydrous hydrogen chloride. After recrystallization from an alcohol-ether mixture, the hydrochloride of 2-[N-(β-hydroxyethyl)-N-ethylaminomethyl] benzodioxan produced melts at 126–127.5° C. The free base will be obtained as described above.

As exemplifying use of the above product as an intermediate, a solution of 9.5 g. of thionyl chloride in 50 ml. of dry chloroform is added to a suspension of 20 g. of the above amino alcohol hydrochloride in 50 ml. of chloroform. The mixture is warmed to 35° C. on a water bath for twenty minutes and then heated to reflux for one and one-half hours. The β-chlorethylamine hydrochloride is isolated by removing the solvent in vacuo and recrystallizing the residue from alcohol-ether mixtures. It melts at 130–132° C. and has the structure:

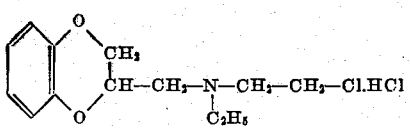

EXAMPLE 2

*2-[N-(β-hydroxyethyl)-N-benzylaminomethyl] benzodioxan hydrochloride*

For the preparation of this compound a solution of 21.7 g. of 2-chloromethylbenzodioxan, 35.8 g. of benzylaminoethanol and 25 ml. of dry xylene is refluxed for 20 hours, cooled and diluted with ether. Benzylaminoethanol hydrochloride is filtered off, the filtrate is washed with water and dried. When anhydrous hydrogen chloride is introduced into the dried solution, the hydrochloride of 2-[N-(β-hydroxyethyl)-N-benzyl-aminomethyl] benzodioxan is formed. After recrystallization from alcohol-ether, it melts at 134.5–137.5° C. The free base will be obtained as described above.

The amino alcohol hydrochloride when treated with thionyl chloride in the same manner as described in Example 1 will yield the β-chlorethyl- amine hydrochloride which melts at 148–151.5° C. and has the structure:

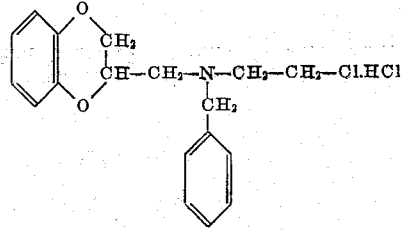

The following are among the many other compounds embraced by the present invention and, by choosing the proper N-substituted amino alcohol, may be prepared by the method described above, and will serve as intermediates for the preparation of the corresponding benzodioxan derivatives as described above.

EXAMPLE 3

2-[N-(β-hydroxyethyl)-N-methylaminomethyl] benzodioxan having the structure:

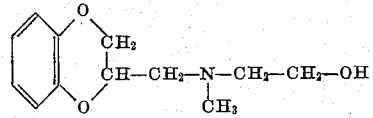

This compound is prepared by the procedure of Example 1, using an equivalent amount of methylaminoethanol instead of ethylaminoethanol. The compound can also be recovered as the hydrochloride as described in Example 1.

EXAMPLE 4

2-[N-(β-hydroxyethyl)-N-allylaminomethyl] benzodioxan having the structure:

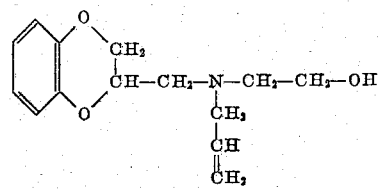

This compound will be prepared by reacting 2-chloromethylbenzodioxan and two molar equivalents of 2-allylaminoethanol by the method described under Example 1, and can be recovered as the hydrochloride if desired.

EXAMPLE 5

2-[N-(β-hydroxyethyl)-N-cyclohexylaminomethyl] benzodioxan having the structure:

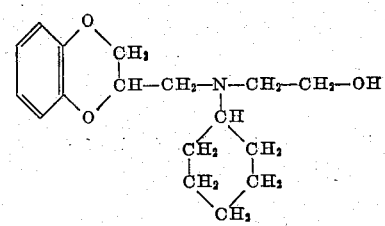

This compound, as the free base or hydrochloride, will be prepared by the method described under Example 1 using cyclohexylaminoethanol in place of ethylaminoethanol.

EXAMPLE 6

2 - [N - (β - hydroxyethyl) - N - cyclohexyl-isopropylaminomethyl] benzodioxan having the structure:

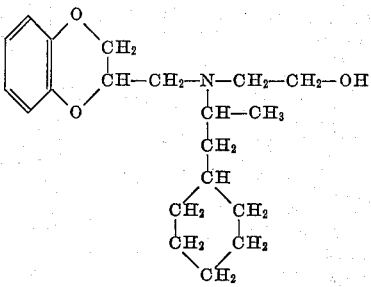

This compound, as the free base or hydrobromide, will be prepared by reaction of 2-bromomethylbenzodioxan with 2-(cyclohexylisopropylamino) ethanol in xylene solution as described under Example 2.

2-(cyclohexylisopropylamino) ethanol is obtained by reductive amination of cyclohexylacetone with ethanolamine in alcohol solution in the presence of platinum catalyst. 2-(cyclohexylisopropylamino) ethanol is recovered by distillation, B. P. 154–158° C. at 2 mm. Hg pressure.

From the above specific examples of the several different types of compounds contemplated by this invention, the specific structure of each and all of the several compounds within the general formulae given and specific exemplification of each and every one of the compounds within the general formula is had by the simple expedient of substituting for Z in the general formulae the substituents given therefor.

From the foregoing general and specific disclosure of procedure for the preparation of the compounds and salts thereof contemplated by this invention, it is apparent to those skilled in the art that all the compounds and salts will be prepared by the procedure described and exemplified by the mere use of the reagents corresponding to any particular compound desired, the reagents for any particular compound being either well known or prepared by the procedure indicated and affording no problem to the chemist.

While in the foregoing examples the products in accordance with this invention are exemplified by their free bases and hydrochloride salts, the several examples will serve as specific examples of other organic and inorganic salts by the mere inclusion of the desired acid radical in the formula for the free base. As has been indicated, where the compounds are obtained as salts, the free bases will be obtained from the salts by usual and well known procedure comprising treatment with an inorganic base such as sodium carbonate, sodium hydroxide, or the like.

The above general formula will serve as specifically exemplifying all the several compounds embraced thereby by a mere substitution in the formula for Z of the substituents given therefor in connection with the formula, i. e., a mere mechanical exercise, hence this specification is not rendered voluminous by the setting forth of formulae for each and every compound contemplated and each and every salt thereof, respectively, such being quite unnecessary in view of the disclosure which makes the structure of each and all thereof entirely clear to those skilled in the art.

This application is a continuation-in-part of application Serial No. 65,507, filed December 15, 1948.

What is claimed is:

1. Benzodioxan derivatives having the following structure:

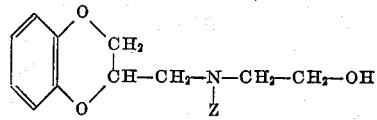

in which Z is selected from the group consisting of lower alkyl, lower alkenyl and benzyl; and organic and inorganic salts of said compounds.

2. A compound having the following structure:

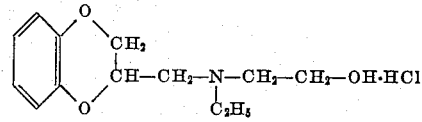

3. A compound having the following structure:

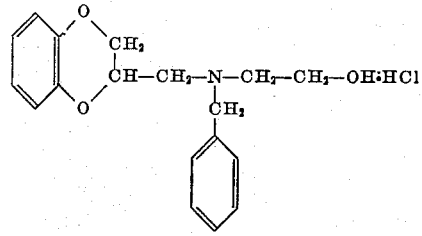

4. A compound having the following structure:

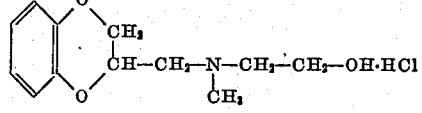

5. A compound having the following structure:

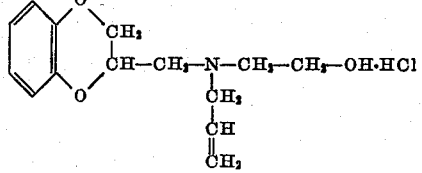

JAMES F. KERWIN.

REFERENCES CITED

The following references are of record in the file of this patent:

UNITED STATES PATENTS

| Number | Name | Date |
| --- | --- | --- |
| 2,056,046 | Fourneau | Sept. 29, 1936 |